(12) United States Patent
Baba et al.

(10) Patent No.: US 12,397,474 B2
(45) Date of Patent: Aug. 26, 2025

(54) PROCESS FOR THE BATCH REACTIVE MIXING AND DEGASSING OF THERMOSETTING POLYMERS AND DEVICE IMPLEMENTING SAID PROCESS

(71) Applicant: Covestro Deutschland AG, Leverkusen (DE)

(72) Inventors: Yasuaki Baba, Kyoto (JP); Tetsuya Sakata, Kyoto (JP); Shigeru Kohara, Kyoto (JP); Ryosuke Eto, Kyoto (JP); Philippe Jeantin, Alixan (FR); Jean-Paul Rodrigues, Chateauneuf-sur-Isere (FR)

(73) Assignees: Covestro Deutschland AG, Leverkusen (DE); Shashin Kagaku Co., Ltd., Kyoto (JP)

( * ) Notice: Subject to any disclaimer, the term of this patent is extended or adjusted under 35 U.S.C. 154(b) by 697 days.

(21) Appl. No.: 17/779,189

(22) PCT Filed: Nov. 25, 2020

(86) PCT No.: PCT/EP2020/083381
§ 371 (c)(1),
(2) Date: May 24, 2022

(87) PCT Pub. No.: WO2021/105220
PCT Pub. Date: Jun. 3, 2021

(65) Prior Publication Data
US 2023/0001605 A1  Jan. 5, 2023

(30) Foreign Application Priority Data
Nov. 25, 2019  (FR) ...................... 1913180

(51) Int. Cl.
*B29B 7/10*  (2006.01)
*B01F 23/47*  (2022.01)
(Continued)

(52) U.S. Cl.
CPC .............. *B29B 7/106* (2013.01); *B01F 23/47* (2022.01); *B01F 29/10* (2022.01); *B01F 33/70* (2022.01);
(Continued)

(58) Field of Classification Search
CPC .......... B29B 7/106; B01F 33/70; B01F 29/10; B01F 35/2117
See application file for complete search history.

(56) References Cited

U.S. PATENT DOCUMENTS 3,778,033 A * 12/1973 Pullman .................. B01F 29/10
366/219
4,728,197 A *  3/1988 Reinhard ............... B01F 29/10
366/219
(Continued)

FOREIGN PATENT DOCUMENTS

CN      204768448 U    11/2015
CN      206642664 U    11/2017
(Continued)

OTHER PUBLICATIONS

Machine Translation of JP 6262087, accessed via worldwide. espacenet.com (Year: 2018).*
(Continued)

*Primary Examiner* — Marc C Howell
(74) *Attorney, Agent, or Firm* — The Webb Law Firm

(57) ABSTRACT

A device for the batch reactive mixing and degassing of thermosetting polymers, such as polyurethane or similar, comprising at least one hermetically sealable container (1) in which the batch of thermosetting polymers is to be placed, a rotary plate (2) on which a satellite rotary plate is rotatably mounted, the container (1) being placed on said satellite rotary plate in order to cause said container (1) to rotate and to revolve, first means for driving the rotary plate (2) and second means for driving the satellite rotary plate, and means (3) for placing the container (1) under vacuum; said device is noteworthy in that it comprises means for controlling the first means for driving the rotary plate (2) providing a speed of revolution of the container (1) and a second means for driving the satellite rotary plate providing a speed (Continued)

of rotation of said container (1), said control means being capable of continuously varying the speed of revolution and the speed of rotation of the container (1) independently of one another. A process for the batch reactive mixing and degassing of thermosetting polymers.

12 Claims, 3 Drawing Sheets

(51) Int. Cl.
    *B01F 29/10*     (2022.01)
    *B01F 33/70*     (2022.01)
    *B29B 7/84*     (2006.01)
    *B01F 35/21*     (2022.01)
    *B01F 35/221*     (2022.01)

(52) U.S. Cl.
    CPC ........... *B29B 7/845* (2013.01); *B01F 35/2117* (2022.01); *B01F 35/221422* (2022.01)

(56) References Cited

U.S. PATENT DOCUMENTS

| | | | | |
|---|---|---|---|---|
| 5,352,037 | A * | 10/1994 | Jouvin | B29B 7/106 494/33 |
| 5,551,779 | A * | 9/1996 | Gantner | B01F 29/10 366/217 |
| 6,755,565 | B2 * | 6/2004 | Flackett | B01F 29/10 366/217 |
| 2002/0132353 | A1 * | 9/2002 | Tamura | G01N 35/1002 422/63 |
| 2002/0172091 | A1 * | 11/2002 | Hatakeyama | B01F 35/421 366/144 |
| 2007/0002681 | A1 * | 1/2007 | Vanderbilt | B01F 23/47 366/217 |
| 2007/0002682 | A1 | 1/2007 | Vanderbilt et al. | |
| 2009/0281663 | A1 * | 11/2009 | Robida | B01F 35/221422 700/265 |
| 2015/0173868 | A1 * | 6/2015 | Overton | B01F 35/562 366/151.1 |
| 2018/0304175 | A1 * | 10/2018 | Takaoka | B01F 29/10 |

FOREIGN PATENT DOCUMENTS

| | | |
|---|---|---|
| CN | 109621807 A | 4/2019 |
| JP | 201616390 A | 2/2016 |
| JP | 6262087 B2 | 1/2018 |
| WO | 2005/025717 A1 | 3/2005 |
| WO | 2009/020167 A1 | 2/2009 |
| WO | 2009/137480 A1 | 11/2009 |
| WO | 2011/155370 A1 | 12/2011 |

OTHER PUBLICATIONS

International Search Report and Written Opinion received for PCT Patent Application No. PCT/EP2020/083381, mailed on Feb. 23, 2021, 8 pages.

\* cited by examiner

[Fig. 1]
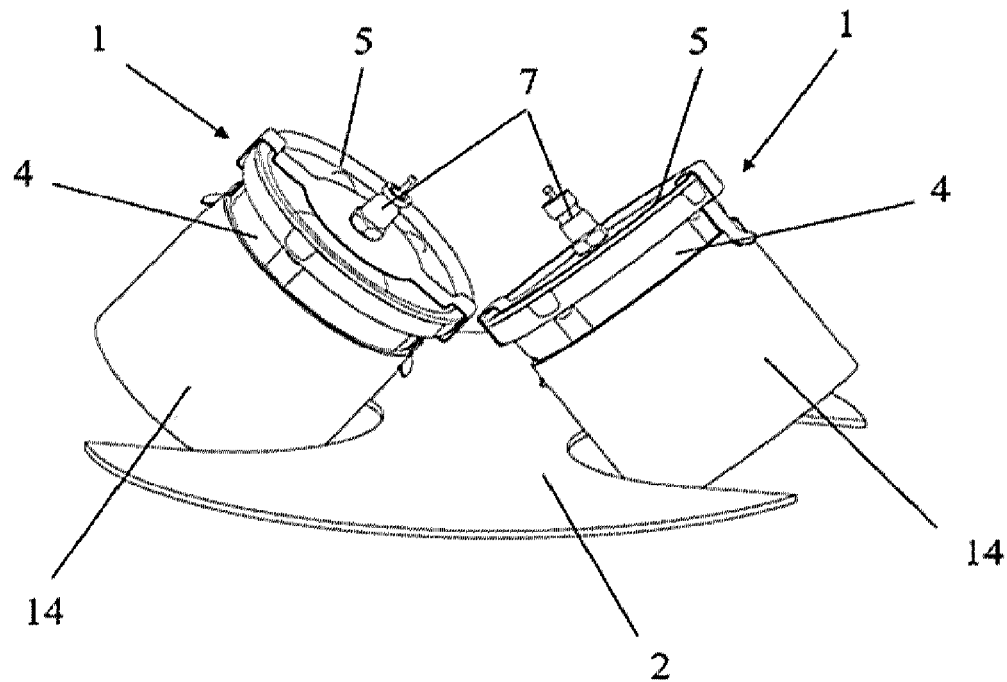
[Fig. 2]
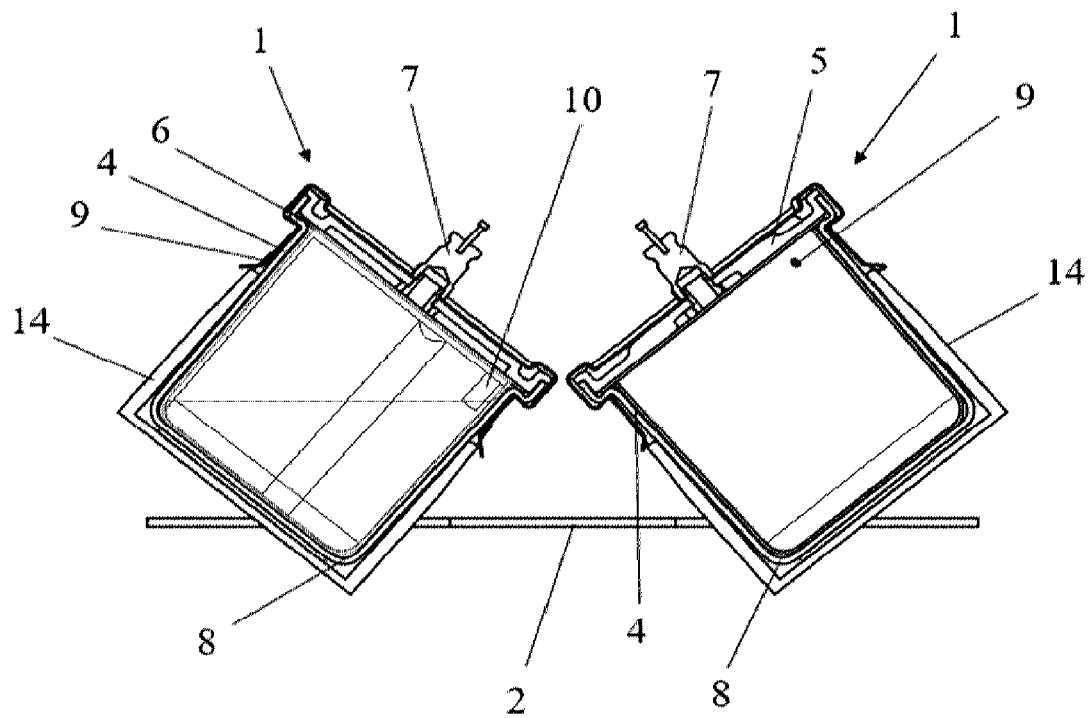

[Fig. 3]
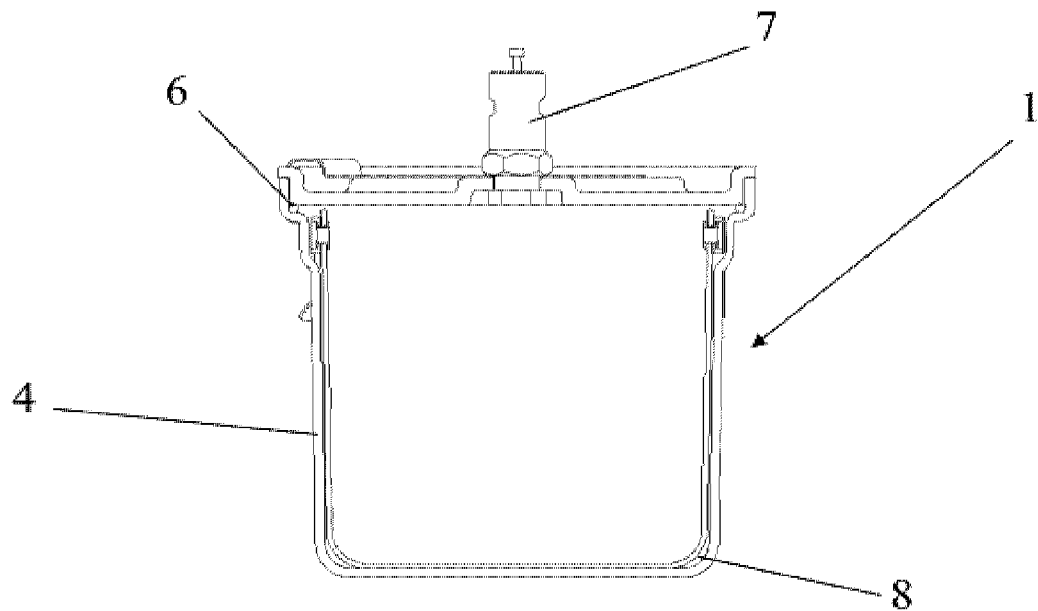
[Fig. 4]
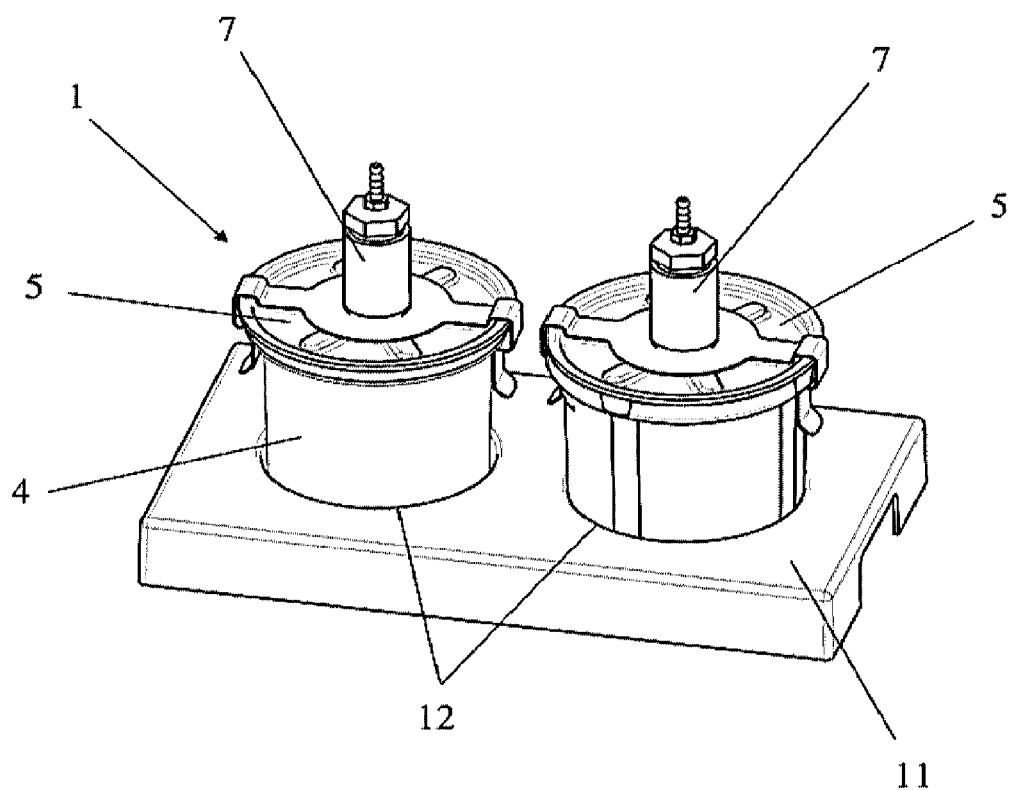

[Fig. 5]
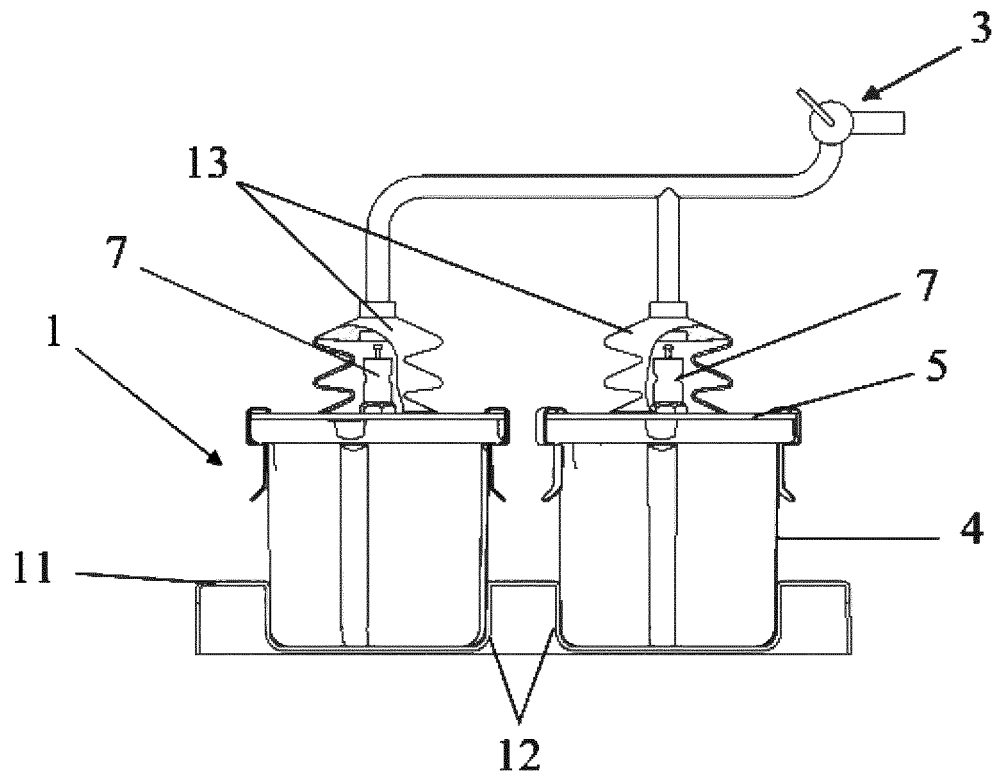
[Fig. 6]
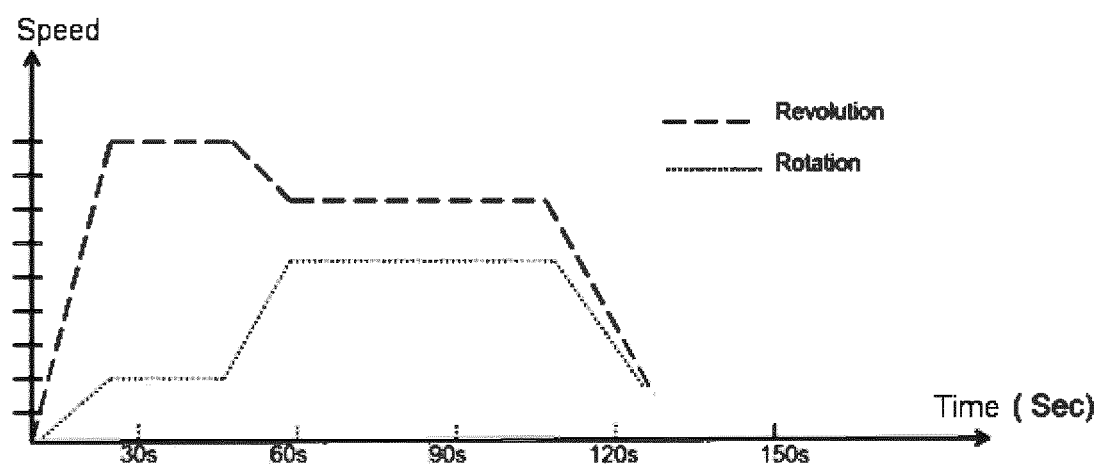

PROCESS FOR THE BATCH REACTIVE MIXING AND DEGASSING OF THERMOSETTING POLYMERS AND DEVICE IMPLEMENTING SAID PROCESS

CROSS-REFERENCE TO RELATED APPLICATIONS

This application is a national stage application (under 35 U.S.C. § 371) of PCT/EP2020/083381, filed Nov. 25, 2020, which claims benefit of French Application No. 1913180, filed Nov. 25, 2019, both of which are incorporated herein by reference in their entirety.

TECHNICAL FIELD

The present invention relates to a device and process for the batch reactive mixing and degassing of thermosetting polymers such as formulations of polyurethanes or similar.

PRIOR ART

In the field of the batch reactive mixing of a plurality of components such as those of formulations of polyurethane or of other thermosetting polymers, it is well-known practice to use devices referred to as planetary mixing devices which combine a rotation about the axis of revolution of a container placed on a rotating plate, at an incline, the axis of revolution of the plate not being coaxial with the axis of rotation of the container. Combining the two rotary motions at a relatively high speed exerts a substantial mixing force on the components. Said components may be highly viscous, to the extent of being a thick paste, solid fillers which can also be dispersed, or liquid components which can also be mixed even though they are generally more difficult to mix than viscous components.

Such devices are described in documents WO2005/025717, WO2011/155370 or WO2009/020167 in particular.

Document WO2005/025717 describes a stirring/deaerating device, designed to stir and to deaerate an object intended to be kneaded, or a body of high viscosity, through the simultaneous rotation and pivoting of a receptacle which holds the object intended to be kneaded, the piping (wiring) linking the receptacle and an external device not being twisted even when the receptacle is turned. A stirring/deaerating device stirs and deaerates an object intended to be kneaded by turning a receptacle which holds the object intended to be kneaded about the axis of rotation of the receptacle, while causing said receptacle to turn about the axis of revolution. The stirring/deaerating device has a first rotary drive mechanism such as a motor, designed to turn a turntable, a second rotary drive mechanism intended to cause the receptacle to turn in the opposite direction to the rotation of the turntable and at the same speed as the latter, and one or more distribution means, such as a suction tube for example, one end of which is connected to the receptacle and the other end of which is connected to an external apparatus.

Document WO2011/155370 describes a device for kneading and defoaming under vacuum which can subject a material in the form of a paste, contained in a cylindrical container for paste, to sufficient and uniform kneading and to defoaming. The device for kneading and defoaming under vacuum comprises: a turning element that is capable of revolving which is arranged inside a chamber intended to be placed in a low-pressure state, and which turns within a horizontal plane about a reference drive axis of rotation; a means for holding the container, which is arranged on the orbital edge of the turning element that is capable of revolving, so as to be able to turn about an operational axis of rotation that is parallel to the reference drive axis of rotation, and which removably holds a container for paste in a state such that the central axis of the container for paste obliquely intersects the operational axis of rotation; a drive mechanism that turns the turning element that is capable of revolving and the means for securing the container. An opening formed in the container for paste, for the introduction of a paste material, has a degassing valve which opens the interior space of the container for paste to the interior space of the chamber under the action of a centrifugal force caused by the revolution and the spinning of the container for paste, or a gas-permeable membrane that is impermeable to the paste material.

Document WO2009/020167 describes a deaerator for a kneading machine which makes it possible to knead a material to be treated while deaerating the machine by turning a container holder about the axis of rotation that passes substantially though the centre of the footprint of a container and substantially parallel to the axis of revolution on the orbit of revolution, while turning the container holder that holds the container which makes it possible to contain the material to be treated about the axis of revolution. When the container turns about the axis of rotation while turning about the axis of revolution, the inner wall face at the side face portion of the container extends to approach the axis of rotation as it substantially passes the central portion of the container in the height direction and it goes upwards and downwards from a virtual plane that is substantially perpendicular to the axis of rotation.

We also know documents JP6262087, WO2009/137480 and US2007/002682 describing devices for degassing and batch reactive mixing of thermosetting polymers. Document JP6262087 describes a device for degassing and reactive batch mixing of thermosetting polymers such as polyurethane comprising a hermetically sealable container, a rotary table on which a satellite rotary table is rotatably mounted, said container being positioned on said satellite rotary table in order to rotate and revolve said container, and means for evacuating said container. Furthermore, the device includes a revolution motor and a rotation motor, or a single motor, for rotating and spinning the container.

Document WO2009/137480 discloses a dual-axis mixing device having a rotatable main support and one or more attached offset supports such as turntables. The main support and offset rotational supports can be controlled independently of one another to reduce or prevent dead zone formation in materials mixed in the centrifuge. An operator can specify various rotation procedures depending on the materials to be mixed and the operator's observation of the materials during the mixing process.

Document US2007/002682 describes a device and a method of producing a mixture or solution of a liquid and a fusible solid. The method comprises providing, in a container, the liquid and the fusible solid, and subjecting the container to a rotational motion about a first axis in a first direction while rotating the container about a second axis in a second direction to effect a dissolution of the fusible solid and a mixing of the components of the mixture or solution.

However, these devices of the prior art have the drawback of not allowing the satisfactory batch mixing of reactive thermosetting polymers and in particular of polyurethane formulations. Specifically, the devices and processes of the prior art do not allow thorough mixing of all types of polyurethane formulations and/or are too slow to mix reactive formulations and/or cannot properly degas components which have to be degassed beforehand under vacuum.

DISCLOSURE OF THE INVENTION

One of the aims of the invention is therefore to overcome these drawbacks by providing a device and process for effectively degassing and mixing reactive thermosetting formulations, and in particular polyurethane, in a short time and at low cost.

To this end, and according to the invention, what is provided is a device for the batch reactive mixing and degassing of thermosetting polymers, such as polyurethane or similar, comprising at least one hermetically sealable container in which the batch of thermosetting polymers is to be placed, a rotary plate on which a satellite rotary plate is rotatably mounted, the container being placed on said satellite rotary plate in order to cause said container to rotate and to revolve, first means for driving the rotary plate and second means for driving the satellite rotary plate, and means for placing the container under vacuum; said device is noteworthy in that it comprises means for controlling the first means for driving the rotary plate providing a speed of revolution of the container and a second means for driving the satellite rotary plate providing a speed of rotation of said container, said control means being capable of continuously varying the speed of revolution and the speed of rotation of the container independently of one another.

Preferably, during a mixing and degassing cycle, the ratio of the speed of rotation to the speed of revolution is variable and non-zero.

Advantageously, said device comprises means for determining the speed of rotation and the speed of revolution of the container according at least to the components of the batch of thermosetting polymers and to the weight of said components.

Additionally, the device according to the invention advantageously comprises at least one sensor for determining the components of the batch of thermosetting polymers that are placed in the container and a weight sensor for measuring the weight of each component of the batch of thermosetting polymers, said sensors being connected to the means for determining the speed of rotation and the speed of revolution of said container.

Furthermore, the container comprises at least one cylindrical main body, a removable cover comprising a seal capable of ensuring a sealtight closure between the cover and the removable cover, and a poppet check valve rigidly connected to the cover, said poppet check valve being capable of cooperating with the means for placement under vacuum.

Said container advantageously comprises a removable cylindrical bowl capable of being placed in the cylindrical main body.

Said removable bowl and/or the main body comprises means for preventing the rotation of the removable bowl within the main body.

In order to facilitate the removal of the degassed composition and/or cleaning of the removable bowl, at least the inside wall of said removable bowl is covered with a layer obtained from a non-stick material.

According to one execution variant, said removable bowl is obtained from polyethylene (PET).

Furthermore, advantageously, the container is formed of a cylindrical main body obtained from thermoformed poly (acrylonitrile butadiene styrene), referred to as ABS.

Another subject of the invention relates to a process for the batch reactive mixing and degassing of thermosetting polymers, such as polyurethane or similar, comprising at least the following steps of introducing the components of the batch of thermosetting polymers into at least one hermetically closed container, placing said container under vacuum and setting the container in rotation and in revolution for a mixing and degassing cycle; said process is noteworthy in that, during said mixing and degassing cycle, the speed of rotation and the speed of revolution of the container are continuously varied independently of one another.

Preferably, the ratio of the speed of rotation to the speed of revolution is variable and non-zero.

Advantageously, the process comprises a prior step of measuring the weight of each component of the batch of thermosetting polymers that is placed in the container and a step of determining the speed of rotation and the speed of revolution of the container according to the formulation to be mixed and the measured weights.

In addition, the process advantageously comprises a prior step of determining each component of the batch of thermosetting polymers that is placed in the container and a step of determining the speed of rotation and the speed of revolution of the container according to the components of the batch of thermosetting polymers.

BRIEF DESCRIPTION OF THE DRAWINGS

Other advantages and features will become more clearly apparent from the following description of a plurality of execution variants, which are given by way of non-limiting examples, of the device and process for the batch reactive mixing and degassing of thermosetting polymers according to the invention, with reference to the appended drawings in which:

FIG. 1 is a partial perspective view of the device for the batch reactive mixing and degassing of thermosetting polymers according to the invention, FIG. 2 is a cross-sectional view of the device according to the invention shown in FIG. 1, FIG. 3 is a cross-sectional view of a container of the device according to the invention, FIG. 4 is a perspective view of the containers of the device according to the invention placed on a frame for placing said containers under vacuum, FIG. 5 is a schematic cross-sectional view of the containers of the device when being placed under vacuum, FIG. 6 is a graphical representation of the speed and rotation curves for the container of the device according to the invention.

EMBODIMENT OF THE INVENTION

Throughout the rest of the description of the according to the invention, the same reference numbers refer to the same elements. Additionally, the various views are not necessarily drawn to scale.

With reference to FIGS. 1 to 5, the device for the batch reactive mixing and degassing of thermosetting polymers, such as polyurethane or similar, comprises in the usual manner at least one hermetically sealable container 1 in which the batch of thermosetting polymers is to be placed, a rotary plate 2 on which a satellite rotary plate or arm (not shown in the figures) is rotatably mounted, the container 1 being placed into a support 14 on said satellite rotary plate in order to cause said container 1 to rotate and to revolve, first means for driving the rotary plate 2 and second means for driving the satellite rotary plate (not shown in the figures), and means 3 for placing the container 1 under vacuum (FIG. 5). Said support 14 consists of cylindrical parts whose internal diameter is just greater than the external diameter of the container 1 in order to receive the latter.

Each container 1 is formed of a cylindrical main body 4 which is advantageously obtained from thermoformed poly (acrylonitrile butadiene styrene), referred to as ABS, a removable cover 5 comprising a seal 6 capable of ensuring a sealtight closure between the main body 4 and the removable cover 5, and a poppet check valve 7 rigidly connected to the removable cover 5, said poppet check valve being capable of cooperating with the means for placement under vacuum 3. In order to allow quicker and easier handling, said container 1 advantageously comprises a removable cylindrical bowl 8 capable of being placed in the cylindrical main body 4. Additionally, said removable bowl 8 and/or the main body 4 comprises means for preventing the rotation of the removable bowl 8 within the main body 4, said means consisting in this particular exemplary embodiment of a lug 9 that protrudes from the outside wall of the removable bowl in proximity to its upper end and cooperates with a vertical groove 10 made in the inside wall of the container 1 from its upper end.

It is of course clear that the means for preventing the rotation of the removable bowl 8 within the main body 4 could consist of any other means well known to a person skilled in the art without departing from the scope of the invention.

In order to facilitate the removal of the degassed composition and/or cleaning of the removable bowl 8, at least the inside wall of said removable bowl 8 is covered with a layer obtained from a non-stick material such as polytetrafluoroethylene (PTFE) or similar. It should be noted that it is also possible for the removable bowl to be obtained from a non-stick material that is recyclable and to be discarded after use, such as polyethylene (PET) for example, without departing from the scope of the invention.

In order to facilitate the placement under vacuum, with reference to FIGS. 4 and 5, the device also comprises a frame 11 formed of a substantially rectangular metal plate in which two recesses 12 have been made to receive two containers 1, the spacing between the containers corresponding to the spacing between the cups 13 of the means for placement under vacuum 3.

The vacuum means 3 may be configured to evacuate the at least one container 1 before the at least one container 1 is set at the support 14.

It goes without saying that, alternatively (not shown in the figures), the containers 1 could be placed under vacuum directly after they have been put in place on the satellite rotary plate of the device without departing from the scope of the invention.

According to an essential feature of the device according to the invention, the latter comprises means for controlling the first means for driving the rotary plate 2 providing a speed of revolution of the container 1 and a second means for driving the satellite rotary plate providing a speed of rotation of said container 1, said control means being capable of continuously varying the speed of revolution and the speed of rotation of the container 1 independently of one another. Continuously varying the speeds of rotation and of revolution of the container 1 in this way provides quick and complete degassing and particularly uniform mixing of the components of the batch of thermosetting polymers.

Preferably, during a mixing and degassing cycle, the ratio of the speed of rotation to the speed of revolution is variable and non-zero.

With regard to this, an example of varying the speeds of revolution and of rotation of the container is shown in FIG. 6, where the upper curve represents the variation in the speed of revolution of the container 1 and the lower curve represents the variation in the speed of rotation of the container 1 during a mixing and degassing cycle.

Furthermore, advantageously, said device comprises means for determining the speed of rotation and the speed of revolution of the container 1 according at least to the components of the batch of thermosetting polymers and to the weight of said components. These determining means consist of a computer provided with a processor and with a memory or of any electronic apparatus comprising at least a processor and a memory such as a tablet, a smartphone or similar.

Additionally, the device according to the invention advantageously comprises at least one sensor for determining the components of the batch of thermosetting polymers that are placed in the container 1 and a weight sensor for measuring the weight of each component of the batch of thermosetting polymers, said sensors being connected to the means for determining the speed of rotation and the speed of revolution of said container 1.

Thus, the process for the batch reactive mixing and degassing of thermosetting polymers, such as polyurethane or similar, according to the invention comprises at least the following steps:
 i) introducing the components of the batch of thermosetting polymers into at least one hermetically closed container 1;
 ii) placing said container 1 under vacuum and setting the container 1 in rotation and in revolution for a mixing and degassing cycle;
 iii) continuously varying the speed of rotation and the speed of revolution of the container 1 during said mixing and degassing cycle, the speeds of rotation and of revolution being varied independently of one another.

It will be noted that the placement of the container under vacuum is between 5 and 20 mbars PABS, which allows the gases dissolved in the components to be removed as well.

Preferably, the ratio of the speed of rotation to the speed of revolution is variable and non-zero.

Advantageously, the process comprises a prior step of measuring the weight of each component of the batch of thermosetting polymers that is placed in the container and a step of determining the speed of rotation and the speed of revolution of the container according to the measured weights and/or a prior step of determining each component of the batch of thermosetting polymers that is placed in the container and a step of determining the speed of rotation and the speed of revolution of the container according to the components of the batch of thermosetting polymers.

By way of example illustrating the effectiveness of the process and device according to the invention, a 400 gram batch based on 100 parts by weight of TDI (toluene diisocyanate) polyester pre-polymer (with low free monomer content) 3.6% containing the isocyanate (NCO) functional group and on 8.7 parts of an amine chain extender such as DMTDA (dimethyl thio-toluene diamine) is perfectly degassed and mixed using the following process. The composition is placed in a container and then it is placed under vacuum for 30 seconds, with a degree of vacuum inside the container reaching 15 mbars PABS, before the start of mixing, said vacuum being maintained in the container for the entire duration of the mixing and degassing process, by setting said container 1 in rotation and in revolution for a mixing and degassing cycle. Said mixing and degassing cycle comprises a first step with a speed of revolution of 740 revolutions per minute (rpm) and a speed of rotation of 530 revolutions per minute (rpm), i.e. a ratio of the speed of rotation to the speed of revolution of 0.71, for about 50 seconds, and then a second step with a speed of revolution of 740 revolutions per minute (rpm) and a speed of rotation of 74 revolutions per minute (rpm), i.e. a ratio of the speed of rotation to the speed of revolution of 0.10, for about 60 seconds.

It should be noted that the speeds of rotation and of revolution cited in the example described above depend on the size of the device, in particular the size of the rotary plate 2 and of the satellite rotary plate, and may therefore vary without departing from the scope of the invention.

A device according to an aspect of the present disclosure includes a device for the batch reactive mixing and degassing of thermosetting polymers, such as polyurethane or similar, comprising at least one hermetically sealable container in which the batch of thermosetting polymers is to be placed,
a rotary member on which a satellite rotary member is rotatably mounted, the container being placed on said satellite rotary member in order to cause said container to rotate and to revolve,
first means for driving the rotary member and second means for driving the satellite rotary member, and
means for placing the container under vacuum.

The device may further comprise control means for controlling the first means and the second means to continuously vary the speed of revolution and the speed of rotation of the container independently of one another.

The container may comprise at least one cylindrical main body, and a removable cylindrical bowl capable of being placed in the cylindrical main body.

Lastly, it is of course clear that the examples given above are merely particular illustrations which are in no way limiting with respect to the fields of application of the invention.

The invention claimed is:

1. A device for the batch reactive mixing and degassing of thermosetting polymers, comprising at least one hermetically sealable container in which the batch of thermosetting polymers is to be placed, a rotary plate on which a satellite rotary plate is rotatably mounted, the container being placed on said satellite rotary plate in order to cause said container to rotate and to revolve, first means for driving the rotary plate and second means for driving the satellite rotary plate, and means for placing the container under vacuum, wherein the device comprises means for controlling the first means for driving the rotary plate providing a speed of revolution of the container and a second means for driving the satellite rotary plate providing a speed of rotation of said container, said control means being capable of continuously varying the speed of revolution and the speed of rotation of the container independently of one another, wherein the device comprises means for determining the speed of rotation and the speed of revolution of the container according at least to the components of the batch of thermosetting polymers and to the weight of said components.

2. The device according to claim 1, wherein, during a mixing and degassing cycle, the ratio of the speed of rotation to the speed of revolution is variable and non-zero.

3. The device according to claim 1, wherein the device comprises at least one sensor for determining the components of the batch of thermosetting polymers that are placed in the container and a weight sensor for measuring the weight of each component of the batch of thermosetting polymers, said sensors being connected to the means for determining the speed of rotation and the speed of revolution of said container.

4. The device according to claim 1, wherein the container comprises at least one cylindrical main body, a removable cover comprising a seal capable of ensuring a sealtight closure between the main body and the removable cover, and a poppet check valve rigidly connected to the cover, said poppet check valve being capable of cooperating with the means for placement under vacuum.

5. The device according to claim 4, wherein the container comprises a removable cylindrical bowl capable of being placed in the cylindrical main body.

6. The device according to claim 5, wherein the removable bowl and/or the main body comprises means for preventing the rotation of the removable bowl within the main body.

7. The device according to claim 5, wherein at least the inside wall of the removable bowl is covered with a layer obtained from a non-stick material.

8. The device according to claim 5, wherein the removable bowl is obtained from polyethylene (PET).

9. The device according to claim 1, wherein the container is formed of a cylindrical main body obtained from thermoformed poly (acrylonitrile butadiene styrene), referred to as ABS.

10. A process for the batch reactive mixing and degassing of thermosetting polymers, comprising at least the following steps of introducing the components of the batch of thermosetting polymers into at least one hermetically closed container, placing said container under vacuum and setting the container in rotation and in revolution for a mixing and degassing cycle, wherein, during said mixing and degassing cycle, the speed of rotation and the speed of revolution of the container are continuously varied independently of one another, wherein the process comprises a step of measuring the weight of each component of the batch of thermosetting polymers that is placed in the container and a step of determining the speed of rotation and the speed of revolution of the container according to the measured weights.

11. The process according to claim 10, wherein the ratio of the speed of rotation to the speed of revolution is variable and non-zero.

12. The process according to claim 10, wherein the process comprises a step of determining each component of the batch of thermosetting polymers that is placed in the container and a step of determining the speed of rotation and the speed of revolution of the container according to the components of the batch of thermosetting polymers.

* * * * *